Sept. 21, 1971  W. T. DAY  3,606,916
GAUGE APPARATUS AND METHOD FOR CUTTING UNIFORMLY
SPACED ROUTERED TENONS AND MORTISES
Filed Sept. 30, 1969  3 Sheets-Sheet 1
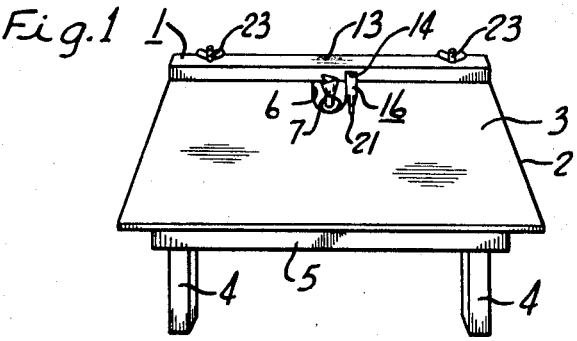
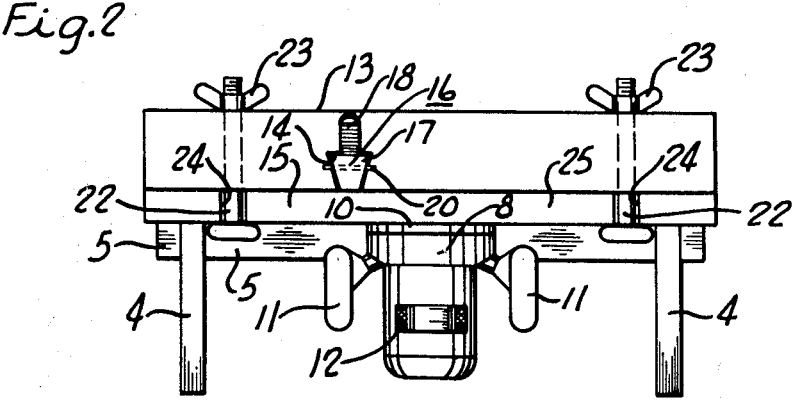
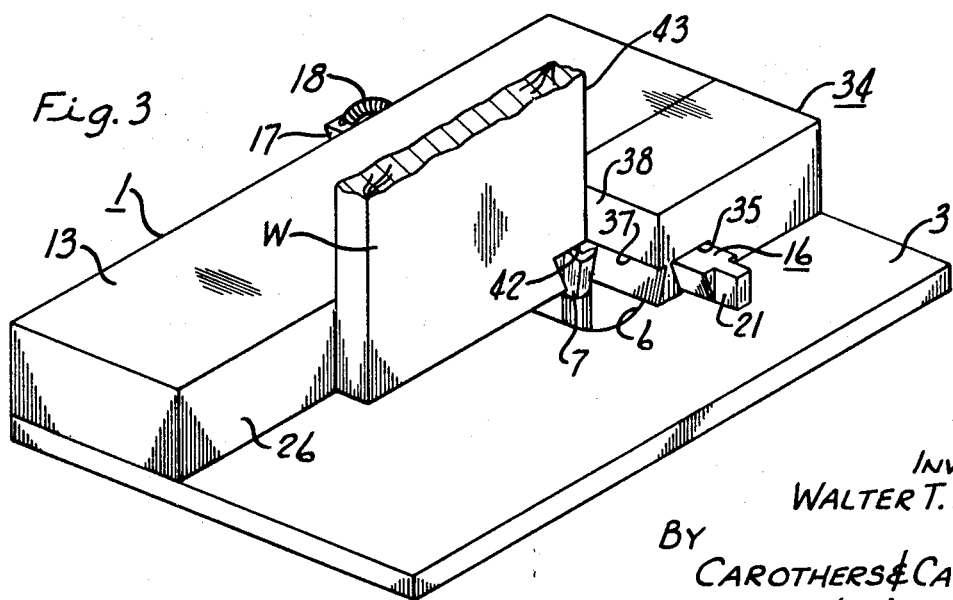
INVENTOR.
WALTER T. DAY
BY
CAROTHERS & CAROTHERS
HIS ATTORNEYS

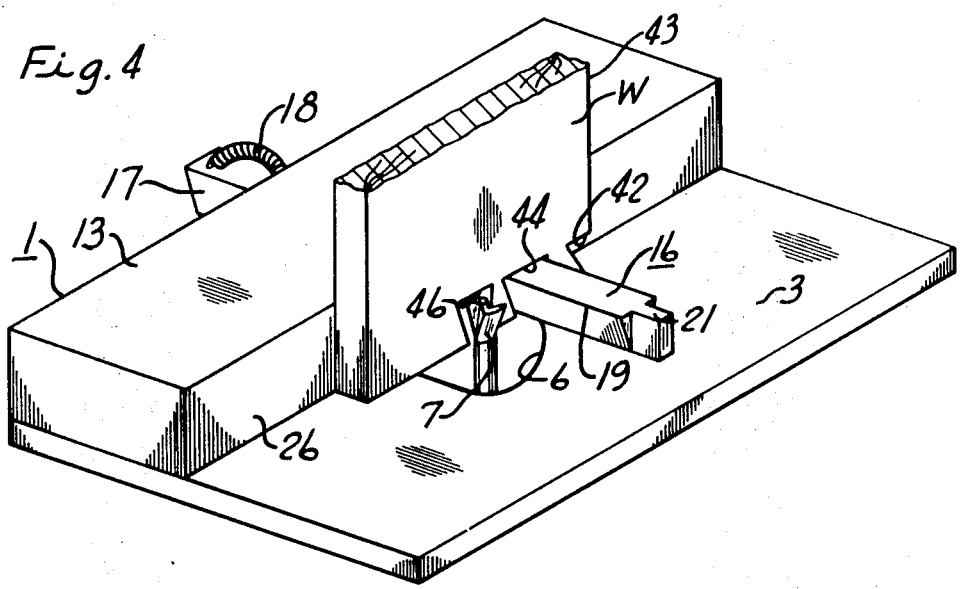
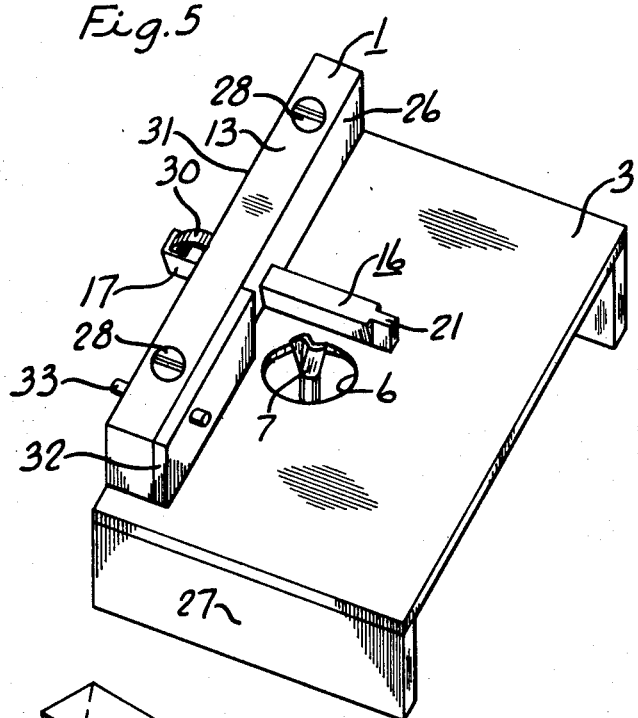
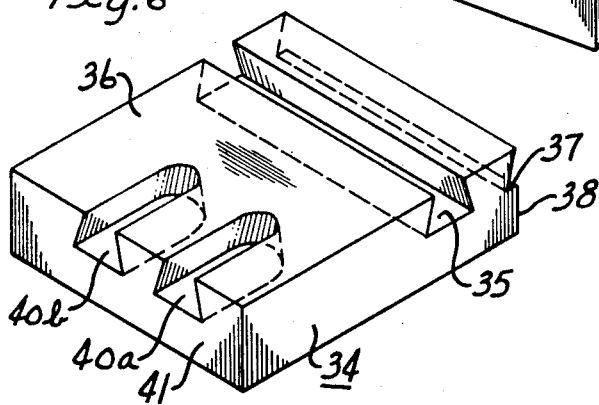

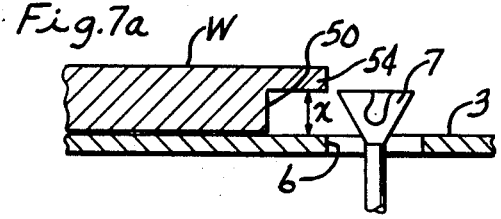
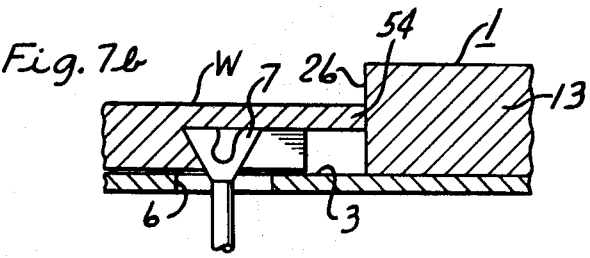
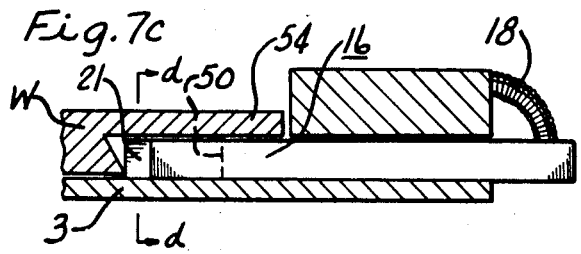
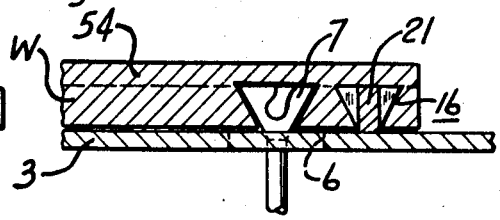
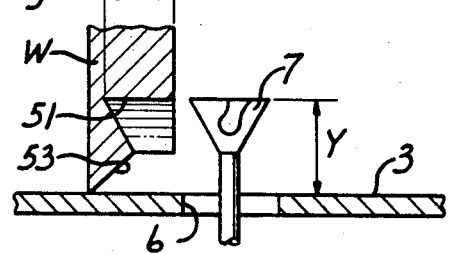
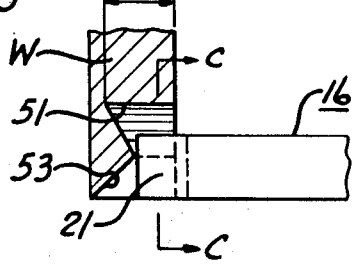
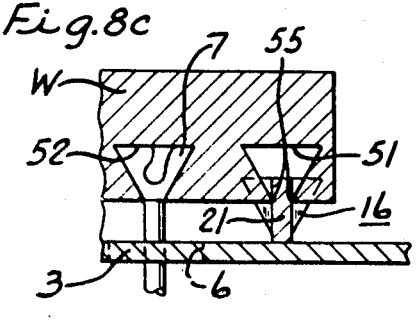
INVENTOR.
WALTER T. DAY
BY
CAROTHERS & CAROTHERS
HIS ATTORNEYS

United States Patent Office 3,606,916
Patented Sept. 21, 1971

3,606,916
GAUGE APPARATUS AND METHOD FOR CUTTING UNIFORMLY SPACED ROUTERED TENONS AND MORTISES
Walter T. Day, Houston, Pa.; Mildred M. Day, heir of the estate of said Walter T. Day, deceased
Filed Sept. 30, 1969, Ser. No. 862,232
Int. Cl. B27f 1/08
U.S. Cl. 144—87                                6 Claims

ABSTRACT OF THE DISCLOSURE

A router gauge for use in combination wtih a router table for cutting uniformly spaced routered mortises and tenons in the end of a workpiece. The gauge comprises an elongated guide bar having a slot in its bottom in a direction normal to the length of the guide bar to receive a guide key which is spring biased to be in a normally extended position from the guide bar. The guide bar is mounted on the router table relative to the router to adjust for the depth of cut to be made by the router in the workpiece. The mounting of the guide bar is done in a manner to properly position the guide key in a preselected distance from the router to guide the advancement of the workpiece during consecutive cutting of a series of uniformly spaced mortises in the workpiece.

BACKGROUND OF INVENTION

This invention relates to tenoning and mortising in woodworking and more particularly to work gauges and guides used in connection with the tenoning and mortising tool (Cl. 144—85, 86, 87, 88, 89, 198, 253).

The art of tenoning and mortising is very old dating back for centuries. It may be generally defined as the making of a notch, hole, or space cut in a workpiece such as wood, referred to as a mortise, to receive in cooperative smooth and uniform relation, a projecting part, referred to as a tenon, shaped to fit the mortise. As such, tenoning and mortising also includes dovetailing which is used in making a specific kind of tenon and mortise joint.

For many years, tenoning and mortising, particularly dovetailing, have had wide use in the woodworking industry in the manufacture of furniture, for example, in the joining of furniture drawer fronts to the drawer sides. The dovetail joint has had wide acceptance due to its neatness and strength.

However, in recent years, the use of the dovetail joint has slowly disappeared because of several main factors. First, due to the time required for dovetailing, particularly by a highly skilled cabinetmaker to prepare such joints, the present-day high cost of labor prevents the application of dovetailing so that costs can be maintained at a minimum level and permit one to remain competitive, such as in the furniture and cabinet industry.

Secondly, due to the vast improvement in glues and adhesives, a simple edge and shoulder joint can be prepared and glued together and provide sufficient strength to maintain indefinitely the glued pieces together.

A third factor also is the fact that one must develop a skill and technique in producing neat and uniform dovetail joints. A skilled cabinetmaker is capable of making a dovetail joint with a router tool because of long years of practice and experience. One who is not so skilled can make use of a dovetail guide commonly found on the market and known as a dovetail template or attachment. Such attachments are provided with a comb, a router stop and two end brackets which are first attached to a jig by means of cleats. After necessary adjustments are made to the position of the comb relative to the workpieces, which are braced together by the attachment, the router dovetail tool is guided along the edge of the teeth of the comb to produce uniformly spaced dovetail tenons.

To become successful in using such an attachment, practice is always suggested first in setting up and using the attachment on scrap workpieces.

With or without such an attachment, the quality of the dovetail joint is gauged by the tightness of the fit of the workpieces when joined together. If the spacing of the dovetail tenons is off by $\frac{1}{32}$ of an inch, the workpieces will be difficult to join and will result in binding. It is not very difficult to be off $\frac{1}{32}$ of an inch in preparing such joints since the quality of the dovetailing depends upon how carefuly one feeds the workpieces into the dovetail router tool, even when one is aided with the dovetail attachment. In this connection, it is one of the prime objects herein to provide a dovetail tenon gauge that requires no skill to use and alleviates the problem of poor dovetail workmanship due to the use of the dovetail template or attachment.

Among the prior art with regard to such tenoning gauges, are DeWitt C. Smith 107,555; Clayton 1,713,329; and Farrow 2,777,485 (144—198).

Clayton provides for a tenon cutting guide block used in conjunction with a circular saw blade and ripping guide on a conventional saw table. However, no provision is made for producing conventional dovetail tenoning nor is there any provision made for proper limitation in guiding the end of a workpiece to be dovetailed into the cutting tool.

Farrow provides a gauge for cutting straight tenons but the gauging requires various adjustments which are not necessary in the gauge apparatus of the present invention.

SUMMARY OF INVENTION

The principal object of this invention is the provision of a gauge for cutting uniformly spaced routered tenons and mortises in the end of a workpiece the main characteristic of which is the employment of a guide bar and associated guide key for proper alignment of the workpiece into the high speed rotated router tool or bit, the guide bar and key being properly adjusted relative to the router bit and then secured to insure that the tenoning forming will be of uniform spacing upon sequential feeding the workpiece into the router bit to form the series of uniformly spaced tenons.

Another object of this invention is the provision of a tenon guide key that is slidably received in the guide bar at a substantially right angle thereto which key may be provided with a dovetail contour to act as a gauge for cutting a series of dovetail mortises in the end of a workpiece. In this regard, the dovetail guide key is spring biased toward the operator and is positioned adjacent the router bit a distance equal to the desired spacing between adjacent dovetail tenons to be formed on the end of the workpiece. The guide key being spring biased permits the mortising in the end of a workpiece of a desired depth therein as well as preventing binding of the guide key relative to the workpiece when the latter is being fed into the router bit, particularly when forming dovetail tenons on the end of the workpiece. In this manner, if the guide key should bind on a previously cut mortise or slot, the guide key will still perform its guiding function by merely retracting within the slot in the guide bar against the force of the biasing spring. Upon withdrawal of the workpiece from the guide key, the latter will spring forward into its original and normally biased position ready for the next sequential pass of the workpiece into the router tool or bit.

Another object of this invention is the provision of a router gauge that is securably adjustable relative to the router tool so that selective sizes and spacing can be obtained in tenoning and mortising the end of a workpiece as well as to provide a guide for the sequential passage of the end of a workpiece into the router bit to produce a series of tenons and mortises of desired uniform spacing.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a general perspective view of the router gauge comprising this invention mounted on a router table.

FIG. 2 is a back side elevation of the router table of FIG. 1.

FIG. 3 is a view of the gauge being employed in cutting an initial dovetail mortise in producing a series of dovetail shaped tenons in the end of a workpiece.

FIG. 4 is a view the same as FIG. 3 illustrating the cutting of a subsequent adjacent dovetail mortise utilizing the router gauge comprising this invention.

FIG. 5 is a perspective view of the smaller type router table utilizing the router gauge comprising this invention.

FIG. 6 is a perspective of a gauge block which may be used to gauge, guide and feed the workpiece in conjunction with the router gauge comprising this invention.

FIGS. 7a through 7d are a series of sectional diagrammatic views illustrating the making of partially hidden or completely hidden dovetail joints.

FIGS. 8a through 8c are a series of sectional diagrammatic views illustrating the making of a completely hidden 45° mitered dovetail joint.

Referring now to the FIGS. 1 and 2, there is shown the router gauge 1 comprising this invention mounted on the router table 2 which comprises the table surface 3 supported by the four legs 4 in conjunction with the support members 5. The rearward extent of the table surface 3 is provided with an opening 6 through which extends the upwardly positioned router bit 7. The router bit 7 is rotatably supported in the chuck of the router motor 8 which is mounted by means of plate 10 to the underside of the table surface 3 as shown clearly in FIG. 2. The router motor 8 is of the conventional type of router commonly found in the open market today and is provided with the pair of handles 11 as well as a router height adjustment indicated at 12 for adjusting the height of the router bit 7 extending upwardly through the opening 6 in the table surface 3.

The router gauge 1 comprises the elongated guide bar 13 provided with a dovetail shaped slot 14 in its bottom surface 15 as shown in FIG. 2. The dovetail slot 14 in the guide bar 13 slidably receives the guide key 16, the rearwear end 17 of the guide key 16 being attached to spring means such as the coil spring 18 as shown in FIGS. 1 through 4 for normally biasing the guide key 16 in a forward direction toward the front of the router table 2. In order to prevent the guide key 16 from sliding through the full extent of the slot 14, a stop means such as the pin 20, as shown in FIG. 2, may be provided at the rearward end 17 of the guide key 16.

As clearly shown in FIGS. 3 and 4, the guide key 16 is provided with a small projection 21 at its forward end which is substantially rectangular in cross-sectional contour.

As shown in FIG. 2, the guide bar 13 is mounted on the table surface 3 by means of the bolts 22 and accompanying wing nuts 23. Slots 24 are provided in the rearward edge 25 of the table surface 3 and extend into the table surface a distance approximately in the same plane as that of the opening 6 in the table surface 3. As readily can be seen in FIG. 2, the guide bar 13 can be securably adjusted on the table surface 3 by moving the guide bar together with the bolts 22 through the slots 24 to a selected position and thereafter tightening the wing nuts 23. By means of this adjustment, the depth of the dovetail mortising can be adjusted, that is, the distanal relationship between the router 7 and the front surface 26 of the guide bar 13 can be selectively adjusted.

The distanal relationship between the router 7 and the guide key 16 is also an important factor in using the gauge comprising this invention. In the usual case, it will be found that this distance is of a standard dimension of ½ inch. However, if a ¼ inch dovetail or, for that mateer, any other size or shape dovetail is desired in connection with using a different dovetail router bit 7, the slots 24 in the table surface 3 can be made in the form of a cross (+) cut out configuration so that adjustment can be made longitudinally of the guide bar 13 as well as forward and rearwardly on the table surface 3.

Reference is now made to FIG. 5 wherein there is shown a simpler configuration of a router table and accompanying router guide 1 comprising this invention. Here, the table surface 3 is of smaller extent and provided with the side legs 27. The side legs 27 as well as the table surface 3 may be metal.

The gauge 1 is secured to the table surface 3 by of the screws 27 and therefore is fixed in position as compared to the securably adjustable gauge of FIG. 1 through 4. Likewise, the gauge 1 of FIG. 5 is provided with a guide key 16 having a forward front projection 21 with its rearward end 17 secured to spring means shown here in the form of a flat coil spring 30. The flat coil spring 30 has one end attached to the guide key end 17 with its other end attached to the rear surface 31 of the guide bar 13. In this manner, the guide key 16 is normally biased in a forward position as shown in FIG. 5 to be in position for gauging and guiding the workpiece to be routered into the dovetail router bit 7.

In order to provide for gauging of the depth of the mortise to be cut in the end of the workpiece, the router gauge 1 of FIG. 5 utilizes the gauge plate 32 which is positioned against the front surface 26 of the guide bar 13 and removably secured thereto by means of the diai pin 33. A series of such gauge plates 32 may be provided so that more than one such gauge plate may be placed on the dial pin in order that one may select the proper distanal relation necessary between the router bit 7 and the guide bar 13. Each of the gauge plates 32 is provided with an aperture through which the dial pin 33 is inserted as clearly shown in FIG. 5.

Reference is now made to the FIGS. 3 and 4 wherein there is shown a close-up perspective view of the set-up operation for cutting a series of dovetail mortises in the end of a workpiece indicated at W. For example, the workpiece W could be considered the side panel of a drawer in a piece of furniture or cabinet. As can be realized, the depth of the cut to be made is the thickness of the workpiece W itself and, as shown in these figures, the guide bar 13 has been positioned and secured a sufficient distance from the router bit 7 to be substantially equal to the thickness of the workpiece W.

As shown in FIG. 3, the gauge block 34 is employed to properly position the workpiece W relative to the router bit 7 to cut the initial dovetail mortise 42. The gauge block 34 is shown in clearer detail in FIG. 6 and is provided with a dovetail slot 35 in its bottom 36 for its full width with a dovetail groove 37 in parallel alignment to the dovetail slot 35 on the side edge 38. Two dovetail shaped mortises 40 are provided in the side edge 41 of the gauge block 34, the function of which will be explained hereinafter. In the particular illustration of the gauge block 34 in FIG. 6, the dovetail shaped slot 35 and its accompanying parallel aligned dovetail groove 37 are of the standard one-half inch dovetail. However, the utilization of other sides of dovetail sizes is only a matter of degree of difference in dimension.

As shown in FIG. 3, the gauge block 34 is initially mounted on the guide key 16 by means of the dovetail shaped slot 35 of the gauge block 34. The position of the slot 35 in the gauge block 30 with respect to the router bit 7 is such that the initial dovetail mortise is properly made in the edge of the workpiece W as indicated as being done at 42 in FIG. 3. The dovetail mortise 42 is half the size of a ½ inch dovetail. However, it is obvious that the initial partial dovetail in the workpiece W can be of any fractional size of a full ½ inch dovetail.

In preparation of the initial partial dovetail in the workpiece W, the gauge block 34, shown in FIG. 6, is used as a guide. The bottom side 36 of the gauge block 34 is placed on table surface 3 with its side edge 38 toward router bit 7 and with guide key 16 slid through dovetail slot 35. The block 34 made to contact the guide bar 13 as indicated in FIG. 3.

The workpiece W is then placed against the surface 38 of the gauge block 34 and fed into the router bit 7, creating the initial partial dovetail 42.

Referring to FIG. 4, the gauge block 34 is then removed and the initially cut partial dovetail is then placed over the left hand facing edge 19 of the guide key 16.

Dovetail cuts 40a and 40b of gauge block 34 are then used as a safety guide or pushing block for all subsequent dovetail cuts to be made in the workpiece W to prevent possible injury to one's hands by the router bit 7.

As shown in FIG. 4, the workpiece W has been guided again into the router bit 7 and it should be noted that the third consecutive passing of the workpiece into the router bit is being made, the dovetail mortise identified at 44 having already been cut previously. The dovetail shaped guide key 16 acts as a guide for the adjacently disposed dovetail mortise 46 being cut, the previously cut dovetail mortise 44 having been slipped over the guide key 16. Thus, the workpiece W may be fed into the router bit 7 by means of a pushing block, such as the gauge block 34 of FIG. 6 wherein the dovetail mortise 40a of the block 34 is postioned on the guide key 16 while the dovetail mortise 40b provides for clearance for the router bit 7 after it has made its passage and cut through the workpiece W forming the dovetail mortise 46. From the foregoing description it can be readily seen that the guide key 16 performs the function of properly spacing the dovetail mortises as they are cut to form, after completion of the dovetailing operation in the end of the workpiece, a series of uniformly spaced dovetail tenons is created. The guide key 16 functions as a guide upon placing the previously cut dovetail mortise over the guide key 16 to function as a gauge and guide while feeding the workpiece W into the router bit 7 to cut the next adjacent dovetail mortise.

It should be noted at this point, that the guide key 16 is spring biased in order to eliminate any malfunctioning of the guide key 16 in feeding the workpiece W into the router bit 7 because of binding between, for example, the already cut dovetail mortise 44 and the guide key 16 of FIG. 4. By the same token, in using the pushing block, such as the gauge block 34 of FIG. 6, the end of the dovetail mortise 40a will be engaged by the end of the guide key projection 21 and carry forward into the router bit 7 the workpiece W as secured on the guide key. Upon withdrawal of the pushing block, the guide key 16 will be permitted to return to its normal position as shown in FIGS. 3 and 4.

The spring biasing of the guide key 16 as well as the provision of the projection 21 on the forward end thereof, also performs another function. The projection 21 becomes particularly useful as a guide when forming a rabbetted dovetail joint as well as flush dovetail joints which are of the partly hidden type. Also, the formation of completely hidden dovetail joints is made possible in an easy and efficient manner with the gauge comprising this invention. A completely hidden dovetail joint can be a 40° or 90° mitered and fully hidden dovetail joint or a straight, fully hidden dovetail joint. The latter type joint is highly successful in the repair of broken wooden airplane wings. The use of the fully hidden dovetail joint in repair of wooden aircraft wings results in such a strong and secure joint that it is acceptable in passing the rigid tests of aircraft safety of the Federal Aviation Administration.

In a hidden or partly hidden dovetail joint, the dovetail mortises are formed partially in the surface of workpiece and inwardly of the end of the workpiece.

FIGS. 7 and 8 are for the purpose of illustrating the making of partially hidden and completely hidden dovetail joints.

A shoulder, such as at 50 in FIG. 7a, is cut in the workpiece W prior to mortising. The router bit 7 is then adjusted for proper height so as not to exceed the thickness of the workpiece, that is, the router bit is adjusted for mortising at a height equal to the thickness of the workpiece W less the thickness of prepared projection 54, which is equal to the distance $x$ of FIG. 7a.

By using the gauge block 34 to properly adjust for the first pass for mortising, the workpiece W can be initially fed into the router bit 7 to form the dovetail mortise as shown in FIG. 7b. As can be seen in FIG. 7b, the gauge guide bar 13 limits the depth of the dovetail mortise to be cut into the end of the workpiece W.

In FIGS. 7c and 7d there is illustrated the application of the guide key 16 in mortising the workpiece W of FIGS. 7a and 7b after the initial dovetail mortising has been made. The guide key 16 properly positions and aligns the workpiece for cutting the next adjacent mortise.

In a fully hidden 45° mitered dovetail joint, the two workpieces to be joined would first be each shouldered as in the case of the workpiece of FIG. 7, except the shoulder 53 formed in each piece would be cut at a 45° angle as illustrated in FIG. 8a in order that a 45° mitered joint can be formed. As in the case above in FIG. 7, the router bit 7 is adjusted for proper height above the router table surface 3, this height being indicated at $y$. By the same token, the depth $z$ of the dovetail mortise is adjusted by adjusting the guide bar 13 the same distance from the router bit 7.

After initially guiding the workpiece W into the router bit 7 to form the initial dovetail mortise 51, the guide key 16 may be used as a guide for the next adjacent mortise 52 by indexing the workpiece W to place the initial dovetail mortise 51 over the projection 21 as illustrated in FIGS. 8b and 8c. In this manner, the workpiece is automatically and uniformly positioned for guidance into the router bit 7 to cut the next adjacent dovetail mortise 52 as illustrated best in FIG. 8c. Note in FIG. 8c that since the shoulder 53 necessitates that the workpiece W be heightened from the router table surface 3 a distance equal to the depth of the shoulder 53, the guide key 16 with its dovetail contour will not fit into dovetail mortise 51 because of the natural "misalignment" caused by shoulder 53 in making the hidden dovetail mortises of the type illustrated in FIG. 8. However, the projection 21 fits snuggly between the corners 55 of dovetail mortise 51 to insure proper guidance of the workpiece W into the router bit 7. This illustration of dovetail mortising points out the importance of providing a movable guide key 16 so that the guide key can retract within the guide bar 13 to permit feeding and proper guidance of the workpiece W into the router tool or bit. Thus, manual alignment or use of a dovetail template or comb is not necessary no matter the type of dovetail joint being prepared.

I claim:

1. In combination a gauge and router table for cutting uniformly spaced routered tenons and mortises in the end of a workpiece comprising a router table provided with an opening therethrough to receive an upwardly extended router bit, a router motor secured from beneath said table to rotatably drive said router bit and having means to adjust the height of extension of said router bit through said table opening, an elongated guide bar adjustably mounted on said table adjacent to said router bit and having a slot formed in the bottom thereof normal to the longitudinal length of said guide bar, a guide key slidable in said slot, and means to bias one end of said guide key to normally maintain the latter in an extended position adjacent to said router bit.

2. The combination of claim 1 characterized in that said elongated guide bar is secured to said router table, a gauge plate attachable to the side of said guide bar adjacent said router bit to adjust for the depth of cut to be made in the workpiece by said router bit.

3. The combination of claim 2 characterized by a plurality of guide bar gauge plates of different thicknesses, a selective of one which may be attached to said guide bar upon selection of the desired depth of cut to be made in the workpiece by said router bit.

4. The combination of claim 1 characterized by a gauge block having a slot to receive the other end of said guide key in a predetermined spaced relation relative to said router bit to gauge and guide the workpiece upon cutting of the initial mortise.

5. In combination a gauge and router table for cutting uniformly spaced routered dovetails in the end of a workpiece comprising a router table provided with an opening therethrough to receive an upwardly extended dovetail router bit, a router motor secured from beneath said table to rotatably drive said router bit and having means to adjust the height of extension of said router bit through said table opening, an elongated guide bar adjustably mounted on said table adjacent to said router bit and having a dovetail slot from in the bottom surface thereof normal to the longitudinal length of said guide bar, a dovetail shaped guide key receivable in said slot and means to bias one of said guide keys to normally maintain the latter in an extended position adjacent to said router bit.

6. The method of cutting uniformly spaced routered tenons and mortises in the end of a workpiece utilizing a router table with a high powered rotated router bit extending upwardly through an opening in the table comprising the steps of providing an elongated guide bar having a slot in its bottom surface position in direction normal to the longitudinal length of the guide bar to slidably receive therein a guide key (a) normally biased to be in an extended position from said guide bar and (b) having a cross sectional contour identical to that of the tenons to be formed by the router bit, mounting the elongated guide bar adjacent to and behind the router bit with the extended guide key position to be adjacent to one side of the router bit, securably adjusting the mounting position of the guide bar on the router table relative to the router bit to provide uniform depth of cut of the tenons to be cut in the workpiece, correlating the position of the guide key relative to the router bit while securably adjusting for the guide bar mounting position to provide for uniformly spacing between adjacently cut tenons, and consecutively feeding the workpiece into the router bit and toward the guide bar to cut the initial tenon, and thereafter utilizing each adjacently cut mortise consecutively positioned on said guide key to cut the next uniformly spaced adjacent mortise to produce a row of uniformly spaced tenons and mortises on the end of the workpiece.

References Cited
UNITED STATES PATENTS

| | | | |
|---|---|---|---|
| 278,815 | 6/1883 | Orum | 144—87X |
| 1,713,329 | 5/1929 | Clayton | 144—198A |

DONALD R. SCHRAN, Primary Examiner

U.S. Cl. X.R.

144—198A, 134A